(12) United States Patent
Ishii

(10) Patent No.: US 8,355,537 B2
(45) Date of Patent: Jan. 15, 2013

(54) IMAGE PROCESSING APPARATUS AND CONTROL METHOD THEREOF

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/949,390

(22) Filed: Nov. 18, 2010

(65) Prior Publication Data

US 2011/0150277 A1   Jun. 23, 2011

(30) Foreign Application Priority Data

Dec. 22, 2009 (JP) ................................. 2009-291410

(51) Int. Cl.
*G06K 9/00* (2006.01)

(52) U.S. Cl. .................... 382/103; 382/162; 382/165

(58) Field of Classification Search .................... 382/103
See application file for complete search history.

(56) References Cited

U.S. PATENT DOCUMENTS

| 2003/0128298 A1* | 7/2003 | Moon et al. .................... 348/578 |
| 2004/0028128 A1* | 2/2004 | Sugiyama et al. ....... 375/240.03 |
| 2006/0126941 A1* | 6/2006 | Higaki ........................ 382/190 |
| 2006/0133654 A1* | 6/2006 | Nakanishi et al. ............ 382/118 |
| 2006/0159370 A1* | 7/2006 | Tanaka et al. ................. 382/305 |
| 2008/0123946 A1* | 5/2008 | Kiuchi et al. .................. 382/164 |
| 2012/0076361 A1* | 3/2012 | Fujiyoshi .................... 382/103 |

FOREIGN PATENT DOCUMENTS

| JP | 11-150676 | 6/1999 |
| JP | 2010059326 | * 3/2009 |

OTHER PUBLICATIONS

Related U.S. Appl. No. 12/964,239, filed Dec. 9, 2010.

* cited by examiner

*Primary Examiner* — Vu Le
*Assistant Examiner* — Chinenye Okafor
(74) *Attorney, Agent, or Firm* — Cowan, Liebowitz & Latman, P.C.

(57) ABSTRACT

In an image included in a moving image, a specific area is registered as a reference area, and a specific hue range of the reference area is set as a first feature amount based on the distribution of hues of pixels in the reference area. When the occupation ratio of pixels having hues included in a second feature amount, obtained by expanding the hue range of the first feature amount in a surrounding area larger than the reference area, is smaller than a predetermined ratio, an area having a high degree of correlation is identified from an image using the second feature amount in the subsequent matching process. When the occupation ratio is equal to or larger than the predetermined ratio, an area having a high degree of correlation is identified from an image using the first feature amount in the subsequent matching process.

4 Claims, 4 Drawing Sheets

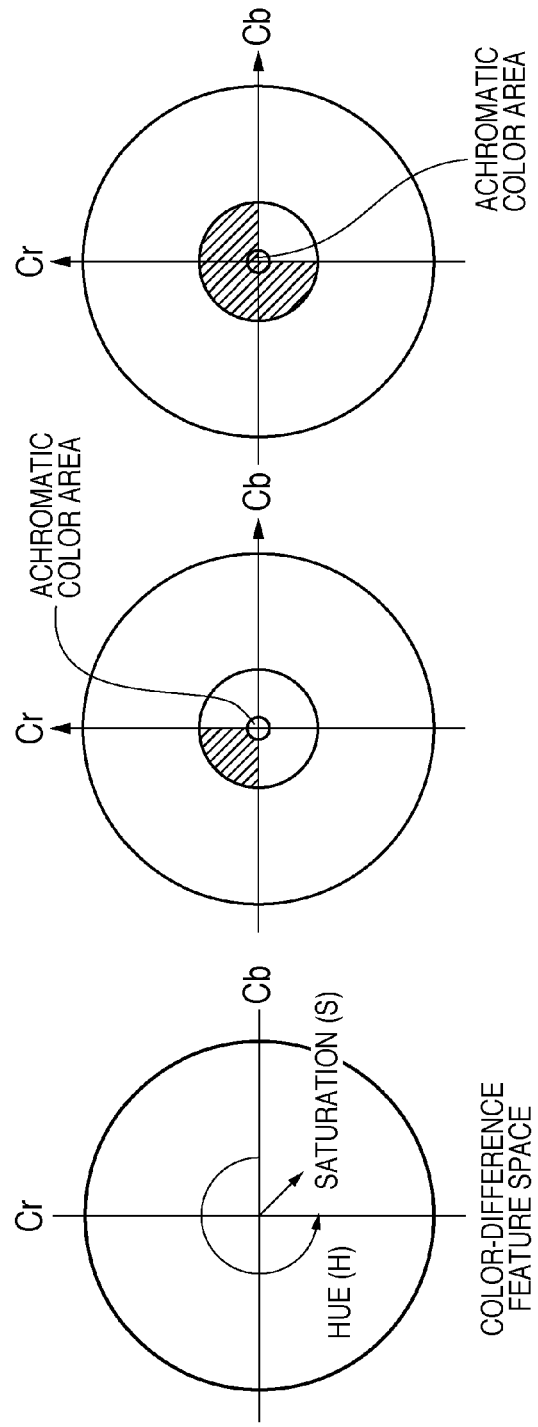

IMAGE PROCESSING APPARATUS AND CONTROL METHOD THEREOF

BACKGROUND OF THE INVENTION

1. Field of the Invention

The present invention relates to a technique for tracking an object in a specific area in a moving image.

2. Description of the Related Art

Conventionally, in an image processing apparatus such as a digital camera or digital video camera, a technique for detecting, by means of an image process, an object set by a photographer or an object pattern which is set in advance in a captured moving image, and tracking that object is known. In such an object tracking techniques based on the image process, a position having a high correlation with the object pattern in an image is determined as a moved position of the object. For this reason, when an imaging range includes an analogous pattern, or when a new analogous pattern enters the imaging range, the object may fail to be recognized.

Japanese Patent Laid-Open No. 11-150676 discloses a technique which detects a moved position of an object by calculating a degree of correlation in a search area using a color-difference histogram of an object to be tracked as a template, and directs a camera in the direction of the object, thereby improving the tracking performance.

However, when the degree of correlation is determined using a set histogram pattern (feature amount) of the object as in Japanese Patent Laid-Open No. 11-150676, the feature amount often changes due to a change in imaging condition, and a wrong object may be tracked or it becomes impossible to track any object. For example, when the set feature amount of the object includes a hue range, if the object has low saturation, and if the brightness of the object changes depending on an illumination condition, the feature amount distribution also changes, and extraction of a high-correlation area often fails.

When the imaging range includes a color analogous to that of the object, the analogous color may be erroneously discriminated as the object, and a wrong object may be tracked.

SUMMARY OF THE INVENTION

The present invention has been made in consideration of the aforementioned conventional problems. The present invention provides a technique that allows an image processing apparatus to stably track an object in a specific area in a moving image.

The present invention in its first aspect provides an image processing apparatus comprising: area registration unit configured to register an image in a specific area of an image included in a moving image as a reference area to be tracked; detection unit configured to detect hues for respective pixels in the reference area; setting unit configured to set a range of hues of pixels, the number of which is larger than the predetermined number of pixels in a distribution of the hues of the pixels in the reference area, as a first feature amount of the reference area; and identifying unit configured to identify an area having the highest degree of correlation with the reference area in an image of a frame after the image including the reference area, wherein when an occupation ratio of pixels having hues included in a second feature amount as a distribution of hues in the reference area, which is obtained by expanding the hue range of the first feature amount, in an area larger than the reference area is smaller than a predetermined ratio, the identifying unit identifies the area having a high degree of correlation with the reference area using the second feature amount, and when the occupation ratio of pixels having hues included in the second feature amount is not less than the predetermined ratio, the identifying unit identifies the area having a high degree of correlation with the reference area using the first feature amount.

Further features of the present invention will become apparent from the following description of exemplary embodiments (with reference to the attached drawings).

BRIEF DESCRIPTION OF THE DRAWINGS

FIG. 4 is a view for explaining a color-difference feature space; and

FIGS. 5A and 5B are views for explaining feature amounts to be decided in the feature determining process.

DESCRIPTION OF THE EMBODIMENTS

An embodiment of the present invention will be described in detail hereinafter with reference to the drawings. Note that one embodiment to be described hereinafter will describe an example in which the present invention is applied to a digital video camera, as an example of an image processing apparatus, which can track a specific area of an object image. However, the present invention is applicable to an arbitrary device that can track a specific area of an object image as a moving image. Note that in this embodiment, "chromatic color" indicates colors within a saturation range set as a feature amount, "achromatic color" indicates colors within a saturation range lower than that set as the feature amount, and they are different from their original definitions.

Figure 1:
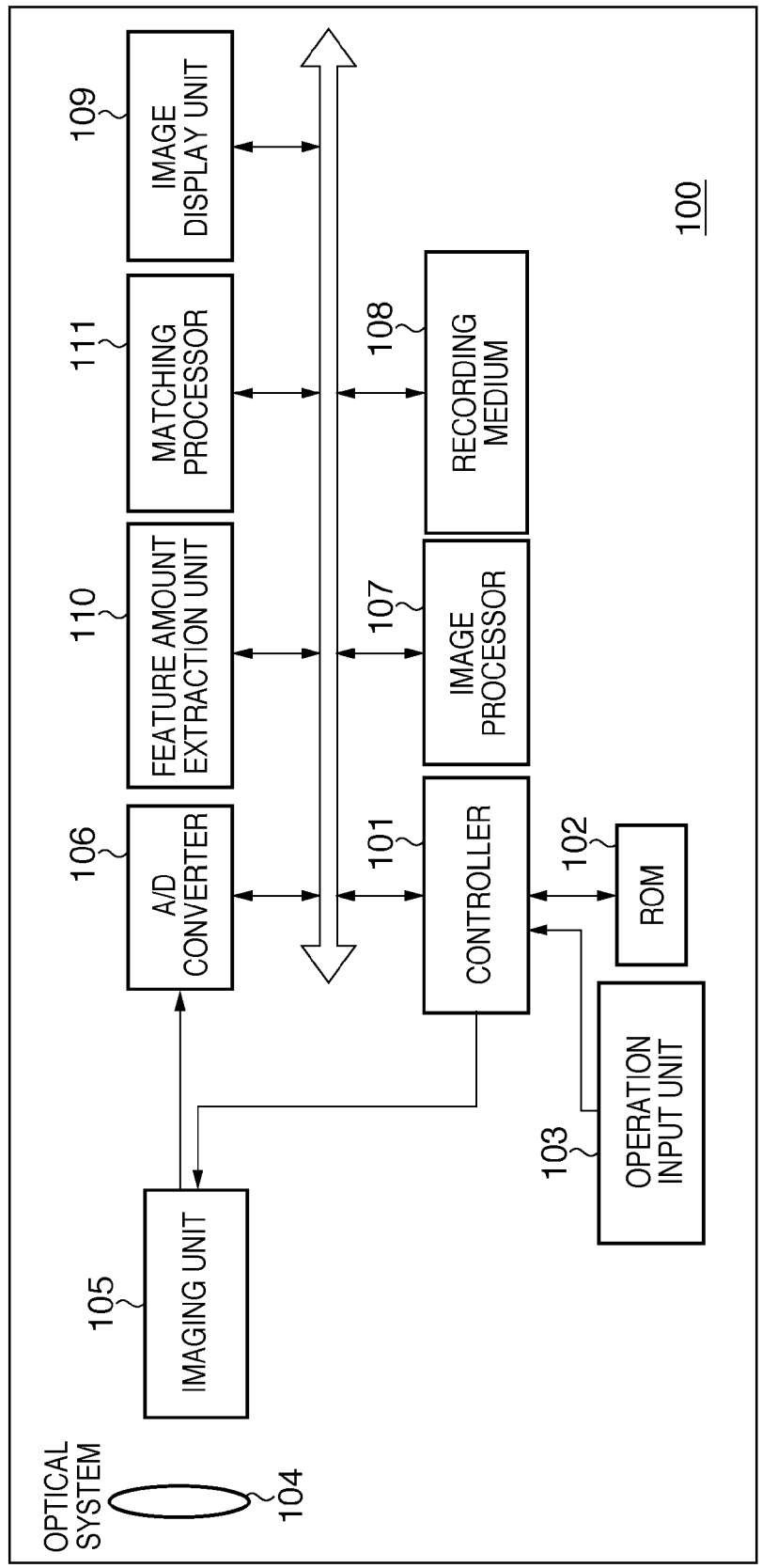
FIG. 1 is a block diagram showing the functional arrangement of a digital video camera according to an embodiment.

FIG. 1 is a block diagram showing the functional arrangement of a digital video camera 100 according to the first embodiment of the present invention.

A controller 101 is, for example, a CPU, which controls the operations of respective blocks of the digital video camera 100 by mapping and executing operation programs of the respective blocks of the digital video camera 100, which are stored in a ROM 102, on a RAM (not shown). The ROM 102 is a non-volatile memory, which stores, for example, parameters required for the operations of the respective blocks of the digital video camera 100, and various settings of the digital video camera 100, in addition to the operation programs of the respective blocks of the digital video camera 100. An operation input unit 103 is a user interface (for example, a menu button and imaging button), which is included in the digital video camera 100 and accepts user's operations. The operation input unit 103 transfers information corresponding to the accepted operation to the controller 101. An example will be described below wherein the digital video camera 100 of this embodiment uses a touch panel type display device as an image display unit 109 (to be described later). The operation input unit 103 also acquires position information on a display area of the image display unit 109 where a touch input is detected by a touch sensor, and also transfers that information to the controller 101.

An imaging unit 105 includes, for example, an image sensor such as a CCD or CMOS sensor. The imaging unit 105 photoelectrically converts an object image formed on the image sensor by an optical system 104, and sequentially outputs an obtained analog image signal to an A/D converter 106. The optical system 104 is a lens group that is configured by a fixed lens, zoom lens, and focus lens, and is included in the digital video camera 100. The optical system 104 forms an image of reflected light of an object on the imaging unit 105. The A/D converter 106 applies A/D conversion to the input analog image signal to obtain a digital image signal (image data), and outputs the digital image signal to an image processor 107. The A/D converter 106 includes, for example, a CDS/AGC circuit, and performs gain adjustment of the digital image signal. The image processor 107 applies various image processes to the digital image signal input from the A/D converter 106 to generate a video signal. The image processor 107 encodes the video signal according to an encoding method and parameters, which are set in accordance with information of a video output format stored in, for example, the ROM 102, and outputs the encoded video signal to a recording medium 108. The image processor 107 converts the input image data on an RGB color space into that on a YCbCr color space, and outputs that image data to a feature amount extraction unit 110 and matching processor 111 (to be described later).

The recording medium 108 includes, for example, a built-in memory included in the digital video camera 100, and a storage device such as a memory card or HDD, which is detachably attached to the digital video camera 100. The recording medium 108 records video data encoded by the image processor 107. The image display unit 109 is, for example, a display device such as a compact LCD included in the digital video camera 100. The image display unit 109 displays video data stored in the recording medium 108. The image display unit 109 serves as an electronic viewfinder by sequentially displaying (through-displaying) image data output from the A/D converter 106.

The feature amount extraction unit 110 is a block which analyzes a designated reference area of the image data on the YCbCr color space, which is output from the A/D converter 106, and extracts a feature amount as a distribution of color information of an image in the reference area. The feature amount is stored in, for example, the RAM, and is used in a matching process (to be described later). The matching processor 111 executes a matching process for identifying an area having a highest degree of correlation with the feature amount from image data captured after the image data in which the feature amount is extracted. Assume that since the matching process uses hue (H) information and saturation (S) information from a color-difference feature space of Cb and Cr shown in FIG. 4, the feature amount also includes hue information and saturation information. Using hue information and saturation information, the matching process can be executed by excluding luminance information which tends to be changed depending on, for example, illumination conditions.

Figure 2:
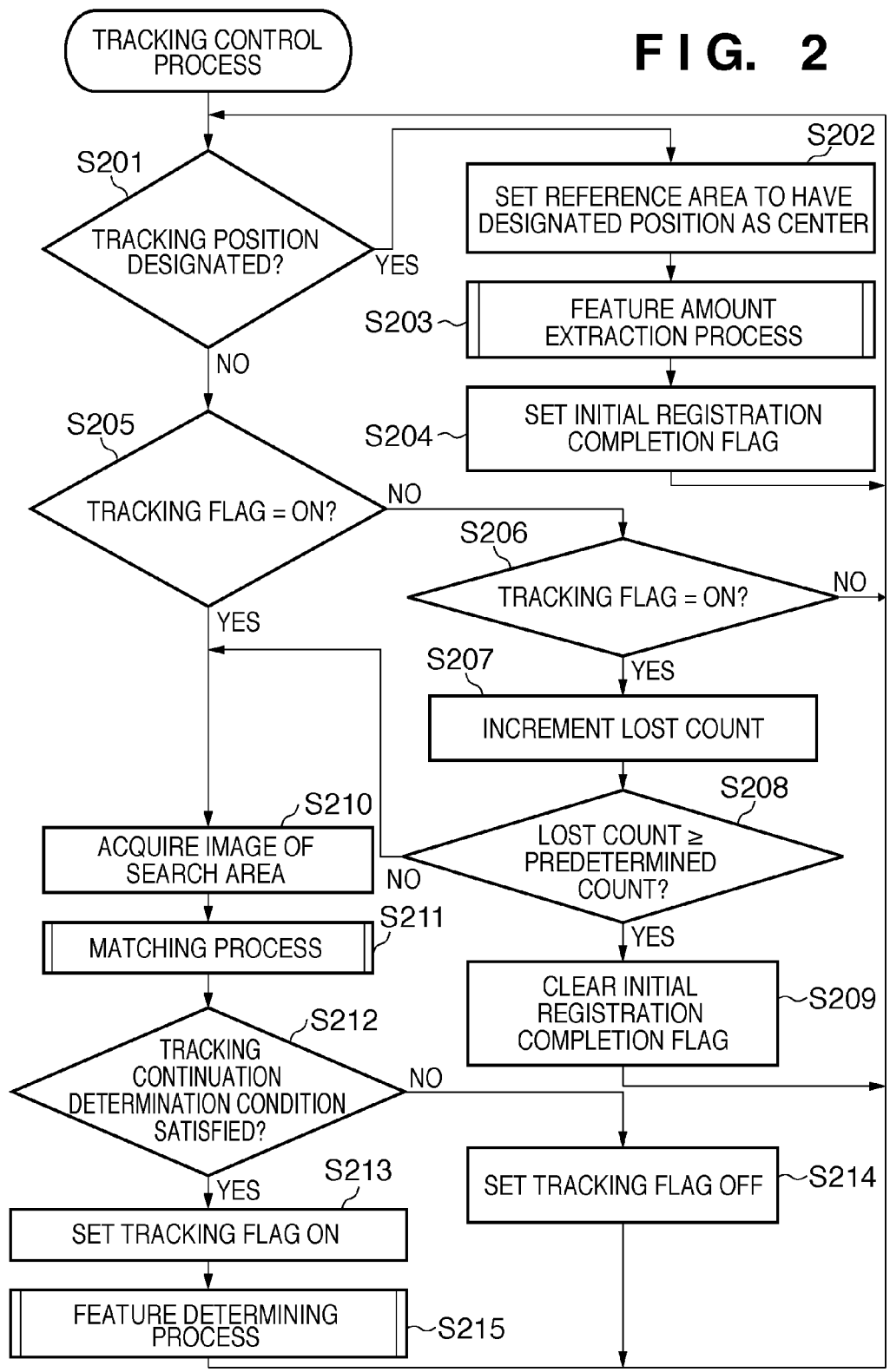
FIG. 2 is a flowchart of a tracking control process according to the embodiment.

A tracking control process of the digital video camera 100 of this embodiment with the aforementioned arrangement will be described below further using the flowchart shown in FIG. 2. Note that the tracking control process is a loop process executed every time a frame is captured in a state in which the power supply of the digital video camera 100 is ON and the image display unit 109 starts a through-display operation.

The controller 101 determines in step S201 if the user makes an input that designates a position of an object to be tracked in an image to the operation input unit 103. Assume that information of the position of the object to be tracked in the image is transferred from the operation input unit 103 to the controller 101 by detecting, for example, a user's touch input on the display area of the image display unit 109 by the touch sensor. The controller 101 stores the input information of the position of the object to be tracked in the image in the RAM as information of a tracking position. If the user makes the input that designates the position of the object to be tracked in the image, the controller 101 advances the process to step S202; otherwise, it advances the process to step S205.

In step S202, the controller 101 sets, to have the designated tracking position as the center, a reference area according to information of the size of an area to be set as the reference area, which is stored in, for example, the ROM 102. The controller 101 acquires hue information and saturation information of the reference area for each pixel and stores them in the RAM. Note that if an area outside image data is included when the size of the area to be set as the reference area is set to have the designated tracking position as the center, the reference area may be set to fall within the image data.

In step S203, the controller 101 transfers information of the reference area to the feature amount extraction unit 110, and controls the feature amount extraction unit 110 to execute a feature amount extraction process, thus extracting a feature amount (first feature amount) of the reference area. The feature amount of the reference area is decided by setting saturation and hue ranges of the reference area to cope with a case in which the imaging conditions change and a case in which the imaging range includes an analogous color.

More specifically, a saturation average value of pixels in the reference area is calculated, and a saturation range to be set as a feature amount is decided based on the saturation average value. For example, when a saturation value used to determine low saturation is stored in the ROM 102, the feature amount extraction unit 110 compares the saturation average value of the reference area with the saturation value used to determine low saturation to determine if the reference area is a low-saturation area. Then, the feature amount extraction unit 110 changes a saturation range (chromatic color) to be set as a feature amount in correspondence with the saturation values of the pixels in the reference area. More specifically, the feature amount extraction unit 110 selects and sets one of the pieces of information of a saturation range in the case of low saturation, and similarly in the case of non-low saturation, (these pieces of information are stored in the ROM 102 in advance) in correspondence with the saturation values in the reference area. Note that both the upper and lower limits of the range in case of low saturation are set to be lower than those of the saturation range in case of non-low saturation. In this manner, the feature amount can be set by excluding information of saturation values of pixels having high deviations of all the pixels included in the reference area.

Note that this embodiment has explained the method of setting the chromatic color range and deciding the feature amount by comparing the saturation value used to determine low saturation with the saturation average value of the reference area. However, for example, the feature amount may be set as follows. For example, the ROM 102 may store, in advance, information of saturation ranges to be set in correspondence with saturation average values, so that the upper and lower limits of a saturation range to be set as a feature amount become lower as the saturation average value of the reference area is lower, and the saturation range may be selected in accordance with the saturation average value. In this case, the saturation ranges to be set in correspondence with the saturation average values need not have the same width, and the width of the saturation range may be changed in correspondence with the saturation average value.

The feature amount extraction unit 110 sets a hue range in the set chromatic color range, and decides a feature amount. The hue range is set based on continuous hues of pixels, the number of which is equal to or larger than the pre-set number of pixels required to determine the hues as a feature amount in a histogram that classifies the hues of pixels in the reference area. The feature amount extraction unit 110 decides the hue and saturation ranges extracted in this way as the feature amounts, and transfers them to the controller 101. The controller 101 then stores the input feature amounts in the RAM as a first feature amount, and sets a tracking flag which is stored in the RAM and indicates to allow tracking to be ON. The controller 101 then advances the process to step S204. Note that the setting example of the first feature amount in consideration of both saturation and hue ranges has been explained. However, the present invention is not limited to this specific example. For example, if a ratio of existence of pixels included in the hue range set as the first feature amount outside the reference area is lower than a threshold which is stored in advance in the ROM 102, even when only the hue range is stored as the first feature amount, the possibility of occurrence of any tracking error is expected to be low. In such a case, only the hue range may be stored as the first feature amount in place of both the saturation and hue ranges.

Note that when the hues of pixels, the number of which is equal to or larger than the pre-set number of pixels required to determine the hues as a feature amount, do not exist in the feature amount extraction process, the feature amount extraction unit 110 transfers a message indicating that it is impossible to set a feature amount from the reference area to the controller 101. Then, the controller 101 may set the tracking flag which is stored in the RAM and indicates to allow tracking to be OFF, and may return the process to step S201. Also, in this embodiment, since the reference area has a predetermined size, the number of pixels required to determine the hues as a feature amount assumes a value set with respect to the predetermined number of pixels of the reference area. However, for example, when the user can set the reference area having an arbitrary size, the number of pixels required to determine the hues as a feature amount may be set to be the number of pixels corresponding to a predetermined ratio of the number of pixels of the set reference area.

In step S204, if the tracking flag is ON, the controller 101 sets an initial registration completion flag, which is stored in the RAM and indicates that the feature amount has already been registered, to be ON. Upon completion of the process in step S204, the controller 101 returns the process to step S201. Assume that the pieces of information of the tracking flag and initial registration completion flag are set to be OFF at the time of activation of the digital video camera 100.

The controller 101 determines in step S205 if the tracking flag stored in the RAM is ON. If the tracking flag is ON, the controller 101 advances the process to step S210.

In a state in which the tracking flag is ON, that is, the reference area and feature amount are registered, and if it is further determined that the reference is allowed to be tracked, the controller 101 extracts image data of a search area from newly captured image data (S210). The search area is a search range which has, as the center, the position set as the center of the reference area in the image captured in the previous frame (the position identified that the feature amount is moved), is set in advance in the ROM 102, and is larger than the reference area, and moves for each frame. That is, in the next frame after the feature amount is extracted, the search range having the tracking position input in step S201 as the center is set. However, in the subsequent frames, a search range is set to have, as the center, a position to which a newly identified reference area has moved. The controller 101 transfers the obtained image data of the search area to the matching processor 111, and advances the process to step S211.

In step S211, the controller 101 transfers the first feature amount and information of the position set as the center of the reference area in the image captured in the previous frame to the matching processor 111, and controls the matching processor 111 to execute a matching process. The matching process is a process for searching the search area for an area having high correlation with the first feature amount of the reference area, and identifying a moved position of the reference area, and can use a known process. For example, using, as a template, an image obtained by binarizing the image of the reference area to pixels which correspond to the feature amount and those which do not correspond to the feature amount, a position having a highest degree of correlation with the template in the search area is identified as a moved position of the reference area. That is, the moved position of the reference area is used as the central position of the search area in the next frame.

Note that the aforementioned matching process is an example and, for example, the process may be executed as follows. This embodiment has explained the method of using an image of the reference area decided based on a point that is initially registered as the tracking position in the matching process. However, an image used in the matching process may be updated for each frame. That is, an image having the same size as a reference area at a position identified as the moved position of the reference area as a result of the matching process may be updated as an image of the reference area used in a new matching process. Alternatively, the matching process may be executed with reference to the hue histogram decided as the feature amount. That is, a degree of correlation may be identified based on the similarity of an occupation ratio of hues decided as the feature amount in an area having the same size as the extracted reference area in the search area.

The controller 101 determines in step S212 if the matching process result satisfies a tracking continuation determination condition. More specifically, as a result of the matching process, if the degree of correlation of the feature amount at a position identified as the moved position of the reference area is smaller than the degree of correlation which is set in advance in the ROM 102 and allows to continue tracking, the controller 101 determines that it is impossible to continue tracking, and advances the process to step S214. In step S214, the controller 101 sets the tracking flag to be OFF, and returns the process to step S201. On the other hand, as a result of the matching process, if the degree of correlation of the feature amount at the position identified as the moved position of the reference area is equal to or higher than the degree of correlation which allows to continue tracking, the controller 101 determines that it is possible to continue tracking, and advances the process to step S213. In step S213, the controller 101 sets the tracking flag to be ON, and advances the process to step S215.

Figure 3:
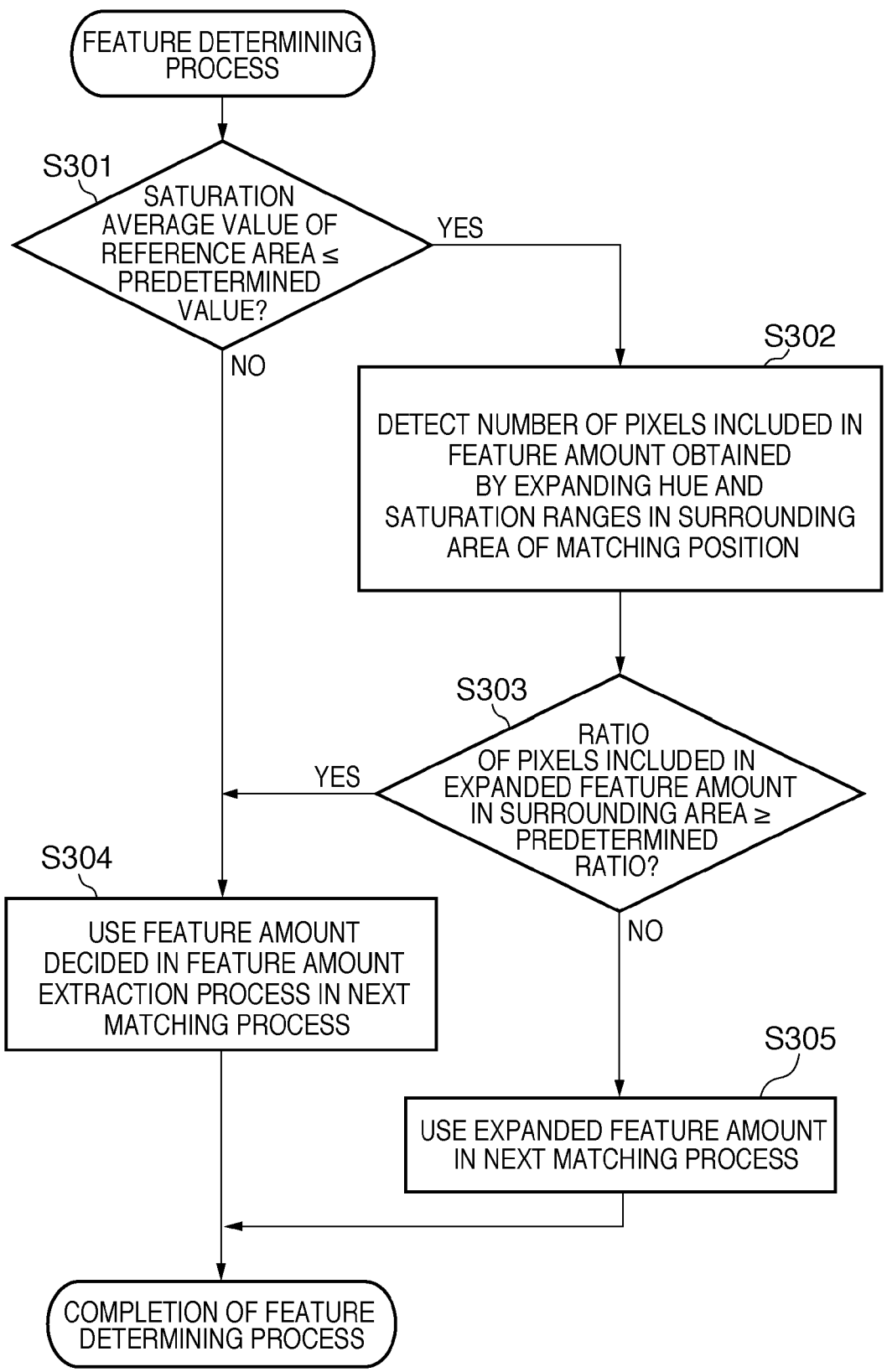
FIG. 3 is a flowchart of a feature determining process according to the first embodiment.

In step S215, the controller 101 executes a feature determining process required to decide a feature amount used upon applying a matching process to an image to be captured in the next frame. The feature determining process will be described in detail below using the flowchart shown in FIG. 3.

The controller 101 determines in step S301 if it is determined in the feature amount extraction process in step S203 that the saturation average value of the reference area is lower than the predetermined saturation value used to determine low saturation. The controller 101 may determine saturation determination information of the reference area again in step S301 or may store that information in the RAM at the time of step S203. If the saturation of the reference area is low, the controller 101 advances the process to step S302; otherwise, it advances the process to step S304.

In step S302, the controller 101 acquires pieces of information of pixels in a surrounding area having, as the center, an area which is identified in the matching process in step S211 and has highest correlation with the reference area in the image captured in the current frame. Then, the controller 101 detects the number of pixels included in a feature amount (second feature amount) obtained by expanding the hue and saturation ranges of the first feature amount of the pixels in the surrounding area. The second feature amount is a feature amount obtained by expanding the hue and saturation ranges of the first feature amount (FIG. 5A), decided in the feature amount extraction process, of pixels in the reference area, as shown in, for example, FIGS. 5A and 5B. In this embodiment, the controller 101 sets, as the second feature amount, a distribution of pixels in the reference area, which are included in a range expanded to include a hue range obtained by expanding that of the first feature amount to both the sides at an equal interval and a range obtained by expanding the saturation range to include that of achromatic colors, as shown in FIG. 5B.

The controller 101 determines in step S303 if an occupation ratio of pixels included in the second feature amount of those in the surrounding area is equal to or larger than a predetermined ratio which is stored in the ROM 102. That is, by recognizing information indicating how many pixels included in the second feature amount exist in the surrounding area, whether or not an image to be captured in the next frame has hues that analogize pixels of the reference area can be estimated. That is, even when the reference area has low saturation, when the surrounding area includes a small number of pixels having hues included in the second feature amount, the possibility of occurrence of any tracking error is expected to be low even when the second feature amount is used in a matching process of the next frame. For this reason, using the second feature amount expanded from the first feature amount, a more precise matching result can be obtained. Also, even when saturation and hue values change depending on, for example, illumination conditions, tracking of the reference area can have redundancy using the second feature amount when the reference area has low saturation. Note that the predetermined ratio may assume, for example, a value obtained by dividing the number of pixels of the reference area by that of the surrounding area. Based on the estimation result obtained in this way, if the occupation ratio of pixels included in the second feature amount of those of the surrounding area is equal to or larger than the predetermined ratio, the controller 101 advances the process to step S304; otherwise, it advances the process to step S305. Note that when only the hue range is set as the first feature amount in place of both the saturation and hue ranges, the second feature amount obtained by expanding the hue range of the first feature amount may be set. In such case as well, tracking of the reference area can have redundancy.

In step S304, the controller 101 sets use of the first feature amount obtained by the feature amount extraction process in the matching process for an image captured in the next frame in, for example, the RAM, thus completing the feature determining process. In step S305, the controller 101 sets use of the second feature amount obtained by expanding the hue and saturation ranges of the first feature amount in the matching process for an image captured in the next frame in, for example, the RAM, thus completing the feature determining process. In this case, in the matching process of the next frame in step S211, the controller 101 transfers the second feature amount to the matching processor 111, and controls the matching processor 111 to execute the matching process using the second feature amount. Note that the controller 101 determines in step S301 if it is determined that the saturation average value of the reference area is lower than the saturation value used to determine low saturation. However, this step S301 may be omitted, and the process may inevitably advance to step S302. In this case, since the processes in steps S302 and S303 are executed even for a high-saturation object which is least influenced by brightness, a processing time prolongs accordingly, but a result having equivalent tracking precision can be obtained.

If it is determined in step S205 that the tracking flag is OFF, that is, the reference area and the feature amount are not registered, or if it is determined as a result of the matching process executed for the previous frame that it is impossible to continue tracking, the controller 101 advances the process to step S206. The controller 101 determines in step S206 if the initial registration completion flag stored in the RAM is ON. If the initial registration completion flag is ON, the controller 101 advances the process to step S207; otherwise, it returns the process to step S201.

In step S207, the controller 101 determines a (lost) state in which an area that matches the reference area cannot be found in the matching process of the previous frame, and increments a lost count stored in the RAM by "1". Then, the controller 101 determines in step S208 if the lost count is equal to or larger than a count value which is stored in the ROM 102 and is used to determine an unrecoverable tracking state. If the lost count is larger than the count used to determine an unrecoverable tracking state, the controller 101 advances the process to step S209; otherwise, it advances the process to step S210. Note that information of a search area set in step S210 at that time has, as the center, the moved position of the reference area finally identified by the matching process. Also, since a moving amount of an object in the reference area is likely to increase during the lost state, a search area may be expanded depending on the value of the lost count.

In step S209, the controller 101 sets the initial registration completion flag stored in the RAM to be OFF, and clears information of the reference area stored in the RAM. The controller 101 then returns the process to step S201 to repeat the tracking control process.

As described above, the image processing apparatus of this embodiment can track an image in a specific area in a moving image. More specifically, the image processing apparatus registers a specific area as a reference area in one image included in a moving image, and sets a first feature amount of the reference area based on at least a hue distribution of pixels in the reference area. At this time, of the hue distribution of the pixels in the reference area, a hue range of the number of pixels larger than the predetermined number of pixels is set as the first feature amount. Then, in an image of a frame after the image including the reference area, a position corresponding to the first feature amount in the reference area is decided by the matching process, thus identifying an area having a high degree of correlation with the reference area.

By making the following determination using the second feature amount obtained by expanding at least the hue range of the first feature amount, a feature amount used in the matching process of the next frame is decided. More specifically, when the occupation ratio of pixels having hues included in the second feature amount is equal to or larger than a predetermined ratio in a surrounding area including an area having a high degree of correlation with a reference area of the image that has undergone the matching process, the first feature amount is used in the matching process of the next frame. On the other hand, when the occupation ratio of pixels having hues included in the second feature amount is smaller than the predetermined ratio in the surrounding area including the area having a high degree of correlation with the reference area of the image that has undergone the matching process, the second feature amount is used in the matching process of the next frame.

In this way, even when an object to be tracked is a low-saturation object readily influenced by brightness, stable tracking with high precision is allowed. That is, when it is estimated based on the image of the frame that has undergone the matching process that a search area of an object in an image of the next frame includes a small number of pixels included in the feature amount obtained by expanding the hue range, the feature amount obtained by expanding the hue range is used in the matching process. For this reason, even when the reference area has low saturation, and hues change depending on, for example, illumination conditions, tracking of the reference area can have redundancy. Note that the above embodiment determines using the image that has undergone the matching process whether or not the occupation ratio of pixels having hues included in the second feature amount in the surrounding area is larger than the predetermined ratio. However, the present invention is not limited to this. That is, before the matching process in step S211, a surrounding area may be set for an image in which the reference area is identified, and whether or not the occupation ratio of pixels having hues included in the second feature amount in the surrounding area of this image is larger than the predetermined ratio may be determined. With this arrangement, which of the first and second feature amounts is to be used can be selected after the first feature amount is set until the first matching process is executed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291410, filed Dec. 22, 2009, which is hereby incorporated by reference herein in its entirety.

What is claimed is:

1. An image processing apparatus comprising:
    area registration unit configured to register an image in a specific area of an image included in a moving image as a reference area to be tracked;
    detection unit configured to detect hues for respective pixels in the reference area;
    setting unit configured to set a range of hues of pixels, the number of which is larger than the predetermined number of pixels in a distribution of the hues of the pixels in the reference area, as a first feature amount of the reference area; and
    identifying unit configured to identify an area having the highest degree of correlation with the reference area in an image of a frame after the image including the reference area,
    wherein when an occupation ratio of pixels having hues included in a second feature amount as a distribution of hues in the reference area, which is obtained by expanding the hue range of the first feature amount, in an area larger than the reference area is smaller than a predetermined ratio, the identifying unit identifies the area having a high degree of correlation with the reference area using the second feature amount, and when the occupation ratio of pixels having hues included in the second feature amount is not less than the predetermined ratio, the identifying unit identifies the area having a high degree of correlation with the reference area using the first feature amount.

2. The apparatus according to claim 1, wherein when a saturation average value in the reference area is not lower than a pre-set saturation value, the identifying unit identifies the area having a high degree of correlation with the reference area using the first feature amount in the image of the frame after the image in which the reference area is identified.

3. The apparatus according to claim 2, wherein the predetermined ratio assumes a value obtained by dividing the number of pixels of the reference area by the number of pixels of the area larger than the reference area.

4. A control method of an image processing apparatus comprising:
    an area registration step of registering an image in a specific area of an image included in a moving image as a reference area to be tracked;
    a detection step of detecting hues for respective pixels in the reference area;
    a setting step of setting a range of hues of pixels, the number of which is larger than the predetermined number of pixels in a distribution of the hues of the pixels in the reference area, as a first feature amount of the reference area; and
    an identifying step of identifying an area having the highest degree of correlation with the reference area in an image of a frame after the image including the reference area,
    wherein when an occupation ratio of pixels having hues included in a second feature amount as a distribution of hues in the reference area, which is obtained by expanding the hue range of the first feature amount, in an area larger than the reference area is smaller than a predetermined ratio, the area having a high degree of correlation with the reference area is identified using the second feature amount in the identifying step, and when the occupation ratio of pixels having hues included in the second feature amount is not less than the predetermined ratio, the area having a high degree of correlation with the reference area is identified using the first feature amount in the identifying step.

* * * * *